US007852345B1

(12) United States Patent
Brown et al.

(10) Patent No.: US 7,852,345 B1
(45) Date of Patent: *Dec. 14, 2010

(54) STORAGE AND SUPPORT FOR LARGE AMOUNTS OF CONSTANT DATA IN A GRAPHICS LIBRARY

(75) Inventors: Patrick R. Brown, Raleigh, NC (US); Barthold B. Lichtenbelt, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/609,845

(22) Filed: Dec. 12, 2006

Related U.S. Application Data

(60) Provisional application No. 60/833,978, filed on Jul. 28, 2006.

(51) Int. Cl.
*G06T 15/00* (2006.01)
(52) U.S. Cl. ..................................... 345/541
(58) Field of Classification Search ........................ None
See application file for complete search history.

(56) References Cited

U.S. PATENT DOCUMENTS

| 5,005,137 | A | 4/1991 | Ernst |
| 5,812,854 | A | 9/1998 | Steinmetz et al. |
| 5,870,097 | A | 2/1999 | Snyder et al. |
| 5,977,977 | A | 11/1999 | Kajiya et al. |
| 6,044,225 | A | 3/2000 | Spencer et al. |
| 6,067,098 | A * | 5/2000 | Dye .......................... 345/531 |
| 6,891,544 | B2 | 5/2005 | Oka et al. |
| 6,982,718 | B2 | 1/2006 | Kilgard et al. |
| 6,983,456 | B2 | 1/2006 | Poznanovic et al. |
| 7,006,101 | B1 | 2/2006 | Brown et al. |
| 7,009,615 | B1 | 3/2006 | Kilgard et al. |
| 7,015,915 | B1 | 3/2006 | Diard |
| 7,394,464 | B2 * | 7/2008 | Peeper et al. ............... 345/503 |
| 2003/0020741 | A1 | 1/2003 | Boland et al. |
| 2003/0210248 | A1 | 11/2003 | Wyatt |
| 2004/0012596 | A1 | 1/2004 | Allen et al. |
| 2004/0158693 | A1 | 8/2004 | Dagan et al. |
| 2004/0169671 | A1 | 9/2004 | Aronson et al. |

(Continued)

OTHER PUBLICATIONS

Office Action. U.S. Appl. No. 11/565,566 dtd Jun. 9, 2009.

(Continued)

*Primary Examiner*—Daniel F Hajnik
*Assistant Examiner*—Andrew Yang
(74) *Attorney, Agent, or Firm*—Patterson & Sheridan, LLP.

(57) ABSTRACT

One embodiment of the invention is a method of accessing a bindable uniform variable bound to a buffer object that includes the steps of creating a linked program object comprising one or more shader programs, where each shader program includes instructions written in a high-level shader language, and where the linked program object includes a reference to a bindable uniform variable and indicates which shader programs use the bindable uniform variable. The method also includes determining a memory size to support the bindable uniform variable, allocating a buffer object having the memory size, binding the buffer object to the bindable uniform variable, populating the buffer object with values for the bindable uniform variable, and accessing the values of the bindable uniform with one or more of the shader programs in the linked program object.

16 Claims, 9 Drawing Sheets

U.S. PATENT DOCUMENTS

| | | |
|---|---|---|
| 2005/0122330 A1 | 6/2005 | Boyd et al. |
| 2005/0125369 A1* | 6/2005 | Buck et al. .................... 706/12 |
| 2005/0140672 A1* | 6/2005 | Hubbell ...................... 345/426 |
| 2005/0243094 A1 | 11/2005 | Patel et al. |
| 2006/0098018 A1* | 5/2006 | Tarditi et al. ................ 345/505 |
| 2006/0114260 A1 | 6/2006 | Diard |
| 2008/0001952 A1* | 1/2008 | Srinivasan et al. .......... 345/502 |
| 2008/0001956 A1 | 1/2008 | Markovic et al. |
| 2009/0010546 A1* | 1/2009 | Rossato et al. .............. 382/199 |

OTHER PUBLICATIONS

Office Action, U.S. Appl. No. 11/609,831, dated Jun. 17, 2009.

\* cited by examiner

STORAGE AND SUPPORT FOR LARGE AMOUNTS OF CONSTANT DATA IN A GRAPHICS LIBRARY

CROSS REFERENCE TO RELATED APPLICATIONS

This application claims priority to the U.S. Provisional Application titled, "API Extensions for Advanced Graphics Processing Units," filed on Jul. 28, 2006 and having U.S. patent application No. 60/833,978.

BACKGROUND OF THE INVENTION

1. Field of the Invention

Embodiments of the present invention generally relate to computer programming techniques for graphics processing systems. More specifically, embodiments of the invention relate to parameter buffer objects used to store shader program parameters.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, a GPU may include multiple texture image units used to store references to texture maps used in graphics rendering operations. One benefit of this new capability is that more efficient texture mapping operations and the like may now be performed on the GPU, thereby increasing overall performance in the graphics pipeline.

To fully realize the additional processing capabilities of advanced GPUs, as much GPU functionality as possible needs to be exposed to graphics application developers. Among other things, doing so enables graphics application developers to tailor their shader programs to optimize the way GPUs process graphics scenes and images. Exposing new GPU processing capabilities to graphics application developers requires that the application programming interface (API) be configured with new calls and libraries that make new features and functionalities directly accessible by developers.

Programmable shader programs executing on a GPU repeatedly perform operations accessing attributes of individual inputs (vertices or fragments) and may also access a set of values that are constant over a set of inputs. Such constants are often referred to as "uniforms" or "program parameters." For example, a vertex shader may perform lighting calculations where the position, direction, and intensity of each light source are stored as uniforms and read by the vertex shader. The use of uniforms in a programmable shader allow an application to access a relatively large amount of data describing a given scene without transmitting all the data for each vertex or fragment processed.

When rendering an image, an application may use a variety of shader programs, each performing a different operation. Although each shader program may be configured to perform a specific function, two or more shader programs may rely upon the same constant data. For example, two or more shader programs may perform lighting operations that use the same data (e.g., lighting information). However, current graphics APIs provide very limited ability to share uniforms among multiple shader programs, and may even require that the same uniform data be duplicated for each shader program. Additionally, a single shader program may operate using different sets of uniforms. For example, different portions of a scene may be illuminated by different lights. Using current APIs, combining all uniforms used over the scene into one large collection may run into implementation-dependent limits on the amount of uniform storage. Dynamic updates to a small set of uniform values can reduce uniform storage requirements, but can incur substantial CPU and GPU overhead. Additionally, updates may require a pause in the highly pipelined GPU to wait for threads using the old values of the uniforms to complete before the update can be performed.

Since the computational power of the GPU relative to the CPU has increased dramatically over the years, applications have progressively moved more computation onto the GPU. For example, applications may perform physics simulations (e.g., computing the position of a set of particles) on the GPU, by executing a shader program on one or more of the processing units of the GPU. The results of those simulations may be used in a variety of ways, including as uniform values for subsequent computations. To perform the next sequential processing pass, however, it is often necessary to transmit the results back to the CPU and through the API so that the data can be sent to the appropriate processing unit of the GPU. This process of moving uniform datasets between the CPU and the GPU can result in a substantial performance penalty.

As the foregoing illustrates, what is needed in the art is a mechanism that provides greater efficiency and flexibility for using bindable uniforms and parameter buffer objects relative to current techniques.

SUMMARY OF THE INVENTION

One embodiment of the present invention sets forth a method for updating data in a buffer object during the execution of a shader program. The method includes the steps of creating a linked program object comprising one or more shader programs, where each shader program includes instructions written in a high-level shader language, and where the linked program object includes a reference to a bindable uniform variable and indicates which shader programs use the bindable uniform variable. The method also includes the steps of determining a memory size to support the bindable uniform variable, allocating a buffer object having the memory size, binding the buffer object to the bindable uniform variable, populating the buffer object with values for the bindable uniform variable, and accessing the values of the bindable uniform with one or more of the shader programs in the linked program object.

One advantage of the disclosed method is that using buffer objects as parameter buffer objects enables a number of graphics rendering operations to be performed without requiring intervention by a CPU, thereby increasing the performance of the graphics rendering hardware. Additionally, a graphics API may be used to update data values stored in a buffer object during rendering operations without having to wait until all active shader programs using one version of data in the buffer object have completely executed before the data values stored in the buffer object may be updated, further increasing GPU performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. Note, however, that the appended drawings illustrate only typical embodiments of this invention and are therefore not to be considered limiting of its scope, for the invention may admit to other equally effective embodiments.

DETAILED DESCRIPTION

Embodiments of the invention allow developers of graphics applications to efficiently and effectively use buffer objects in the local memory of a GPU as the storage space for a bindable uniform variable declared in a shader program or as a parameter buffer object storing one or more parameters used by a shader program. Buffer objects provide a region of memory (i.e., buffers) accessible through an identifier. Buffer objects allow a GPU driver to optimize an internal memory management scheme and choose the best type of memory— such as cached/uncached system memory or graphics memory—in which to store a buffer object.

Generally, parameter buffer objects may be used by an assembly level shader program, and bindable uniforms may be used by shader programs developed in high-level shader languages, such as the OpenGL Shading Language (GLSL) or the Cg shading language. In either case, the use of buffer objects as parameter buffer objects or as the storage space for a bindable uniform allows a number of graphics rendering operations to be performed without requiring intervention by a CPU, thereby increasing the performance of the graphics rendering hardware.

In one embodiment, a uniform variable in a shader program may be declared as being "bindable." As used herein, a "bindable uniform" or "bindable uniform variable" is a uniform variable declared in a shader program, where storage for the uniform is not allocated by a compiler/linker, but instead comes from a buffer object specified by the shader program. Bindable uniforms are a programming construct provided by a high level shader program, such as one composed using the GLSL or Cg shader programming languages. An API call may be used to bind the bindable uniform variable to a particular buffer object. By binding different buffer objects to a bindable uniform, an application may easily switch between different uniform data sets, without having to re-specify the data every time having to pass the data from the CPU to a GPU driver as part of the switch. Further, the same buffer object can be bound to bindable uniforms used by different shader programs. For example, if two shader programs each declare a bindable uniform of the same data type, then accessing a bindable uniform in program object A results in the same data if the same access is made in program object B. Thus, bindable uniforms advantageously allow data sets that may be shared among multiple program objects and shader programs, without storing multiple copies of the data set or requiring multiple updates if the data set is changed.

In one embodiment, a parameter buffer object provides a type of program parameter than can be used as a constant during the execution of vertex, fragment, or geometry shader programs. A graphics hardware device may include a set of parameter buffer binding points to which buffer objects can be attached. This allows a vertex, fragment, or geometry program to read data from an attached buffer objects using a binding like the form "program.buffer[a][b]". This binding reads data from the buffer object attached to binding point <a>. The attached buffer object is treated as an array of 32-bit words or four-component vectors consisting of 32-bit words, and the binding reads the word or vector numbered <b>. The use of buffer objects to store shader program parameters allows applications to change large blocks of shader program parameters at once, simply by binding a new buffer object to a given binding point. A parameter buffer object is a programming construct for shader programs composed in using an assembly level programming language such as an assembly harder language or microcode.

Parameter values (i.e., the data values in a parameter buffer object) may be loaded into the buffer object using a variety of mechanisms provided by a graphics API, including, for example, reading back from the frame buffer, transmitting the values through a transform feedback path, or implementing buffer object loading functions used to map data supplied by a graphics application into the buffer object. A transform feedback path may provide and use feedback and record transformed vertices processed by units within a graphics rendering pipeline. Examples of transform feedback are described in the commonly owned U.S. patent application titled, "Feedback and Record of Transformed Vertices in a Graphics Library," filed on Dec. 12, 2006, having U.S. patent application Ser. No. 11/609,763.

The graphics API may include calls specifically provided to load and/or update data in a parameter buffer object. Thus, parameter buffer objects may provide a great deal of flexibility not available from other assembly language parameter mechanisms. Additionally, in one embodiment, a graphics API may be used to update data values stored in a buffer object during rendering operations without having to wait until all active shader programs using one version of data in the buffer object to complete executing before the data values stored in the buffer object may be updated, thereby increasing GPU utilization.

Architectural Overview

Figure 1A:
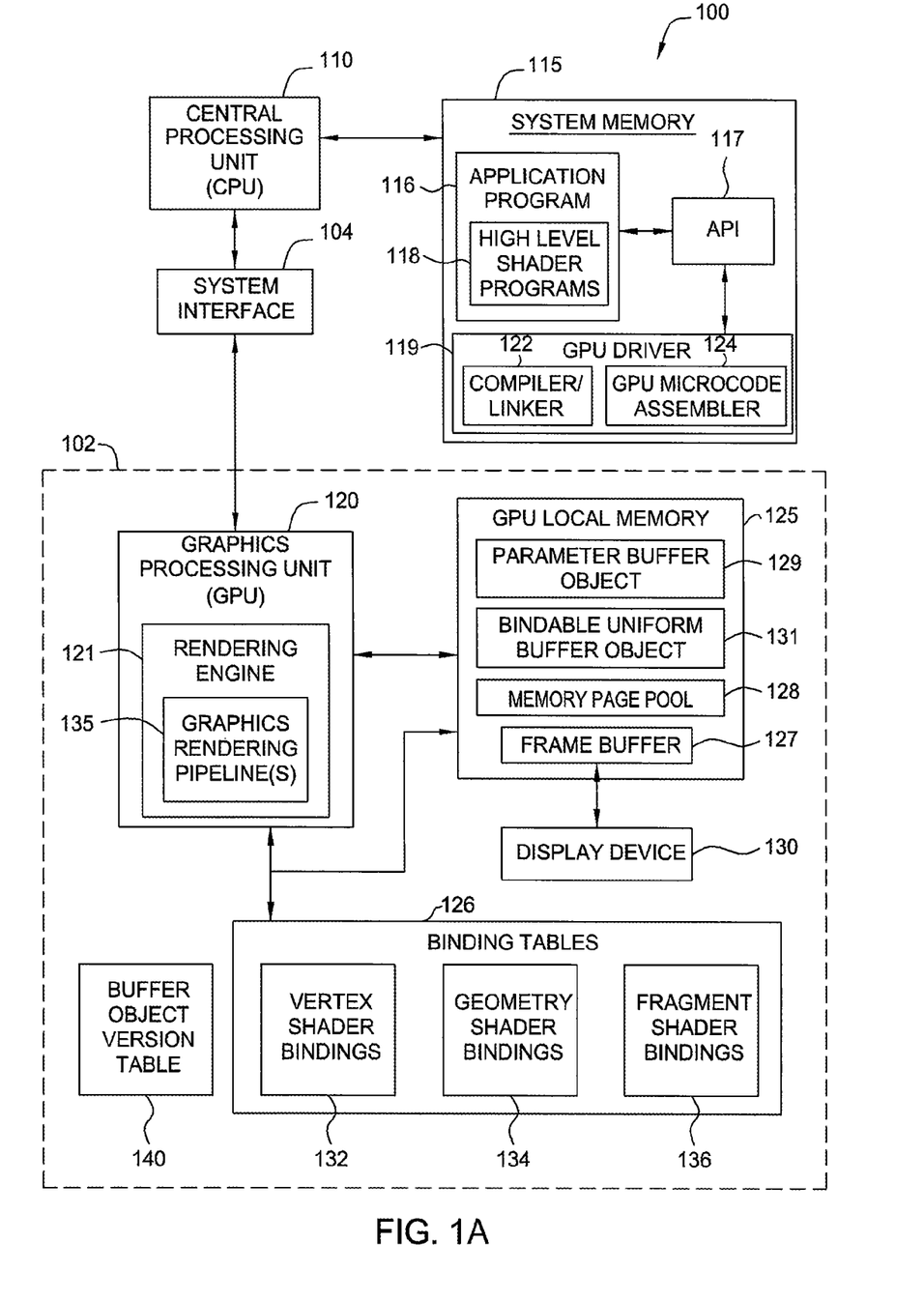
FIG. 1A is a conceptual diagram of a computing device configured to implement one or more aspects of the present invention.

FIG. 1A is a conceptual diagram of a computing device 100 configured to implement one or more aspects of the present invention. As shown, computing device 100 includes, without limitation, a central processing unit (CPU) 110 connected to a system memory 115, a system interface 104, and a graphics processing device 102. Graphics processing device 102 includes graphics processing unit (GPU) 120, hardware binding tables 126, and a local memory 125 coupled to both GPU 120 and a display device 130. CPU 110 generally executes programming instructions stored in the system memory 115, operates on data stored in system memory 115 and communicates with GPU 120 through system interface 104, which bridges communication between the CPU 110 and GPU 120. In alternate embodiments, the CPU 110, GPU 120, system interface 104, or any combination thereof, may be integrated into a single processing unit. Further, the functionality of GPU 120 may be included in a chipset or in some other type of special purpose processing unit or co-processor. Computing device 100 may be, without limitation, a desk-top computer, a laptop computer, a mobile telephone, a set-top box or a personal digital assistant GPU 120 includes at least one rendering engine 121 that incorporates at least one graphics rendering pipeline 135. System memory 115 includes an application program 116, a GPU driver 119 and an application program interface (API) 117. Generally, GPU driver 119 implements the functions and data structures exposed by API 117 for a given GPU 120. The application program 116 generates calls to the API 117 in order to produce a desired set of results, typically in the form of a sequence of graphics images.

In one programming model, the application program 116 transmits one or more high-level shader programs 118 to the API 117 for processing within GPU driver 119 by compiler/linker 122. The high-level shader programs 118 are typically source code text of high-level shader language instructions that are designed to operate on one or more processing units within the GPU 120. In turn, the compiler/linker 122 may be configured to compile and link the source code of high-level shader programs 118. In one embodiment, compiler/linker 122 is configured to provide cross-domain linking capabilities. More specifically, compiler/linker 122 may be configured to translate high-level shader programs 118 designated for different domains into distinct compiled software objects. Compiler/linker 122 also "links" the compiled code to generate a single compiled/linked program object.

The compiled/linked program object generated by compiler/linker 122 may be in the form of assembly code, which would be directed to a GPU microcode assembler 124, which may generate three software objects of domain-specific microcode for GPU 120 to execute. Alternately, compiler/linker 122 may generate GPU microcode directly. The vertex shader microcode is derived from a vertex shader program, the geometry shader microcode is derived from a geometry shader program, and the fragment shader microcode is derived from a fragment shader program. Additional examples of cross domain compiling and linking of shader programs are described in the commonly owned U.S. patent application titled, "Methods and Systems for Processing a Geometry Shader Program Developed in a High-Level Shading Language," filed on Nov. 30, 2006, having U.S. application Ser. No. 11/565,566.

In another programming model, the application may transmit assembly level shader programs for execution on GPU 120. In addition to the high level shader language discussed above, OpenGL also provides an interface for developing shader programs using an assembly level interface to graphics hardware device 102. The source code text of an assembly level shader language program may include assembly level commands used to control the operations of the processing units within the graphics rendering pipeline 135. Further, GPU microcode assembler 124 may be configured to generate software objects of domain-specific microcode from the assembly level commands for execution on the vertex, geometry, and fragment processing units, as the case may be, of graphics rendering pipeline 135. In such a scenario, the application 116 may bypass the compiler/linker 122 and provide the assembly level shader language programs directly to microcode assembler 124. Alternatively, the GPU driver 119 may not include the compiler/linker 122.

Local memory 125 stores, among other things, a frame buffer 127, a parameter buffer object 129, a bindable uniform buffer object 131, and a memory page pool 128. Data output from the graphics rendering pipeline 135 may be stored in frame buffer 127. When graphics rendering pipeline 135 completes rendering a display frame, the contents of frame buffer 127 may be output to display device 130. Typically, display device 130 is a CRT or LCD display. However, the output of rendering operations may not be used for immediate display, such as when graphics rendering pipeline 135 is used to generate frames for an animation sequence or rendered visual effect.

Parameter buffer object 129 stores the constant data used by the different shader programs running on the processing units of graphics rendering pipeline 135. Uniform variable buffer object 131 stores data used by bindable uniform variables declared in shader programs 118. Hardware binding tables 126 are used to manage which buffer objects are bound to which parameter buffer object, and which buffer objects are used to provide memory storage for a given bindable uniform variable. As shown, hardware binding tables 126 includes vertex shader bindings 132, geometry shader bindings 134 and fragment shader bindings 136. In one embodiment, hardware binding tables 126 are used to map a reference to a parameter buffer object in a shader program to an actual buffer object in local memory 125. Changing the buffer object bound to one of the binding points for a given processing unit allows an application to bind and unbind large groups of shader program parameters at once and also to specify the buffer object used to load parameters into when using calls provided by a graphics API.

As described in greater detail herein, memory page pool 128 stores a set of memory pages used to manage multiple versions of a given buffer object, whether the buffer object is used as a parameter buffer object 129 or as a bindable uniform buffer object 131. Memory page pool 128, in conjunction with buffer object version table 140, allows different versions of a given buffer object to be used concurrently by different shader programs running on the processing units of graphics rendering pipeline 135.

Figure 1B:
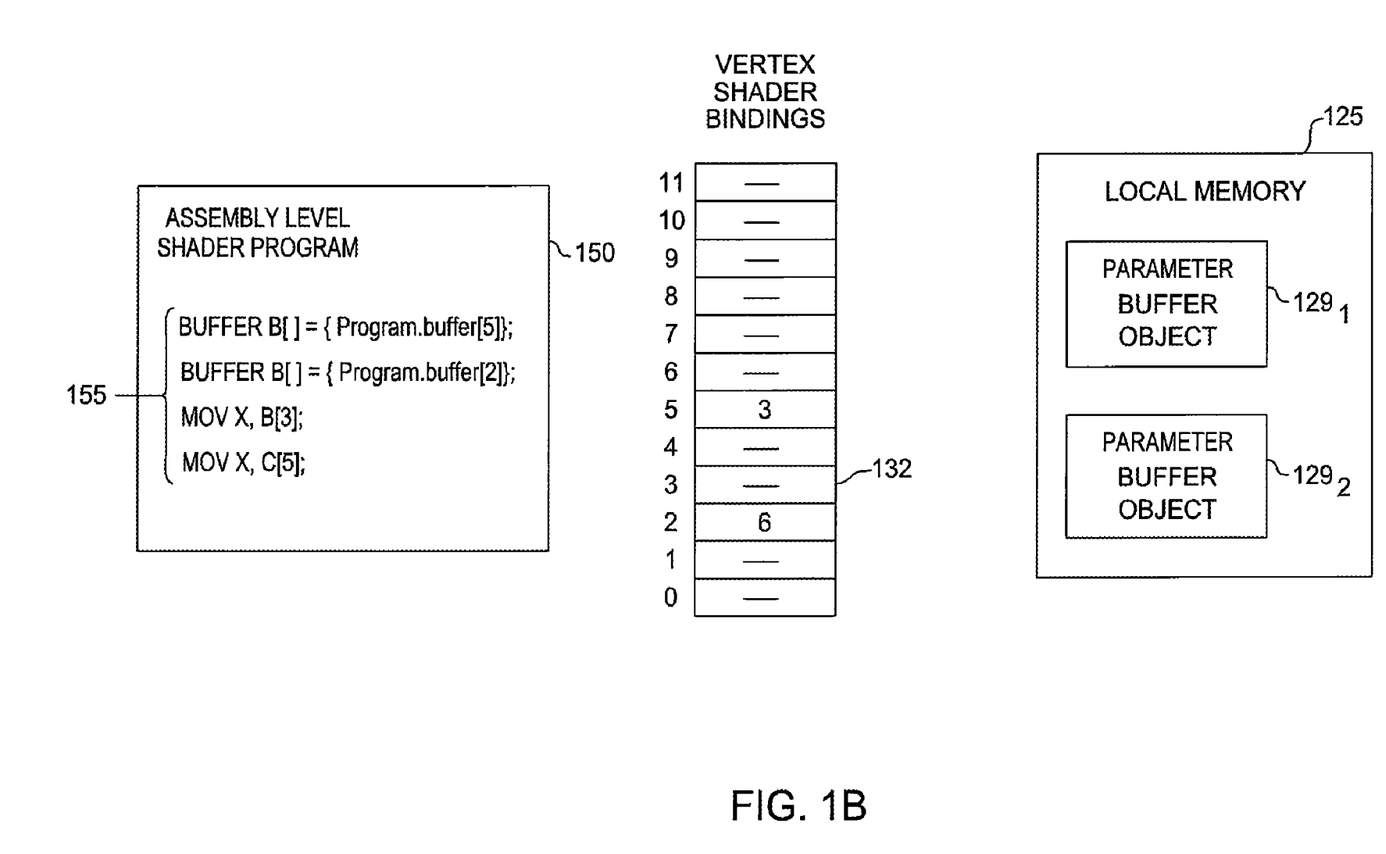
FIG. 1B is a conceptual diagram showing bindings table used to manage bindings between an assembly level shader program and parameter buffer objects, according to one embodiment of the present invention.

FIG. 1B is a conceptual diagram of binding tables 126 used to manage bindings between a shader program and parameter buffer objects, according to one embodiment of the present invention. In one embodiment, the shader program may be compiled by compiler/linker 122 and transmitted to graphics rendering pipeline 135 for execution. Alternatively, an assembly level shader program may be used. In the example of FIG. 1B, an assembly level shader program is used. As shown, assembly level shader program 150 includes references to data values stored in a parameter buffer objects $129_1$ and $129_2$. In this example, vertex shader bindings 132 may be used to store the binding between a parameter buffer object and a vertex shader. Assembly level shader program 150 includes assembly commands to declare a buffer parameter variable "B" to refer to binding point 5 of vertex shader bindings to declare a buffer parameter variable "C" to binding point 2. Once bound, the data values in "B" and "C" are taken from parameter buffer objects $129_1$ and $129_2$. For example, assembly commands 155 include a command to store the fourth element of the buffer bound to "B" to a variable "X" and the sixth element of the buffer bound to "C" to a variable "Y." The application 116 using the API 117 can specify and change the binding of buffer objects to binding points. For example, the application may make an API call to associate the buffer object named "6" ($129_1$) with the binding point numbered 2 in the vertex shader bindings 132, and to associate a buffer object named "3" (129$_2$) with binding point 5. Thus, vertex shader bindings 132 allow a shader program to include bindings to multiple buffer objects. Further, different shader programs may bind to the same underlying parameter buffer object.

Figure 2:
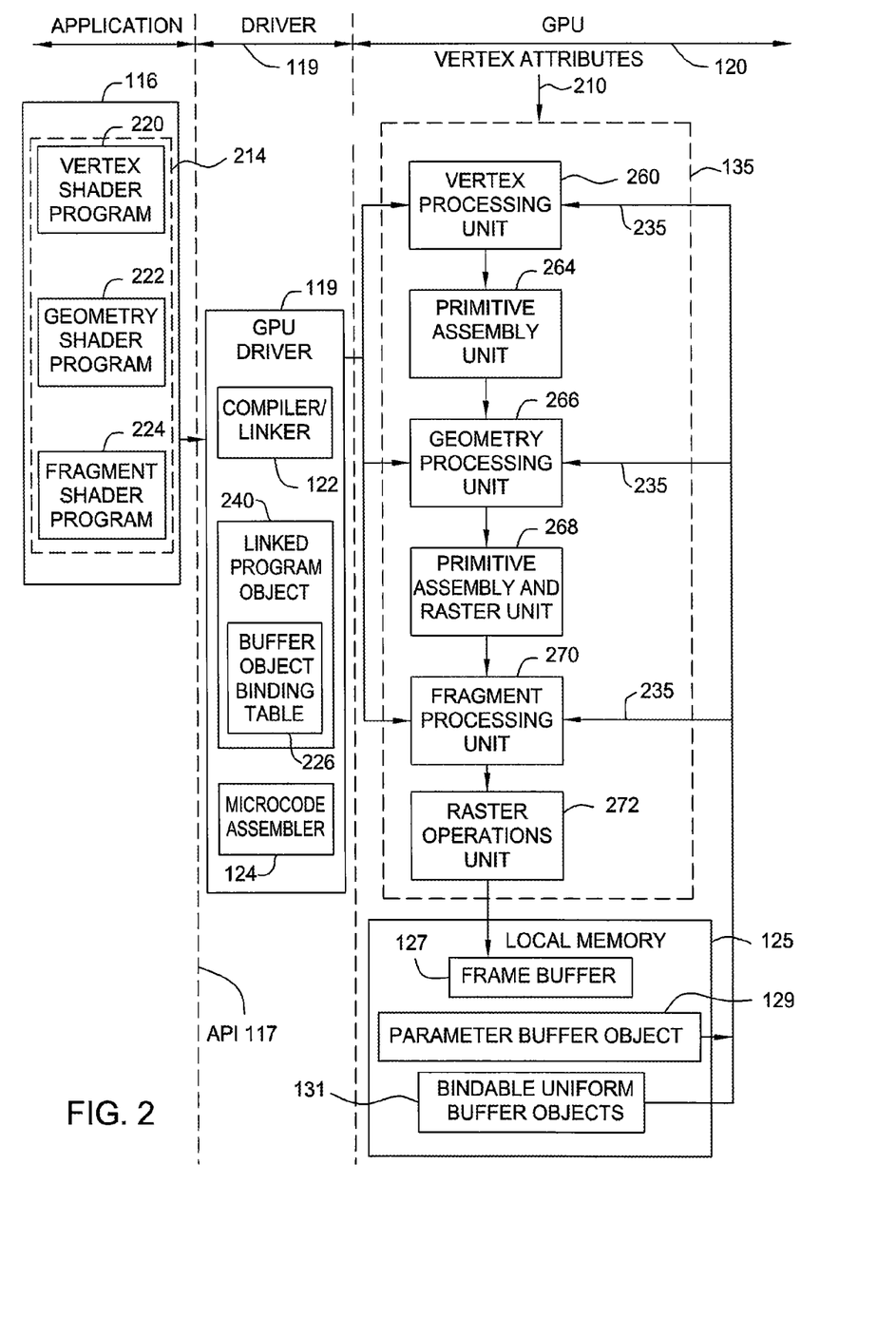
FIG. 2 is a conceptual illustration showing a graphics rendering pipeline accessing buffer objects during graphics rendering operations, according to one embodiment of the invention.

FIG. 2 is a conceptual illustration showing a graphics rendering pipeline 135 accessing buffer objects 129 and 131 during graphics rendering operations, according to one embodiment of the invention. Also included are components of application 116, GPU driver 119, and GPU 120. As shown, graphics rendering pipeline 135 includes a vertex processing unit 260, a geometry processing unit 266, a fragment processing unit 270, and a raster operations unit 272. When used to process graphics data to generate display images, vertex attributes 210 flow into the top of the graphics rendering pipeline 135 and are then processed by the vertex processing unit 260, the geometry processing unit 266, and the converted to fragments which are processed by the fragment processing unit 270 and the raster operations unit 272. Generally, the output of graphics rendering pipeline 135 includes rendered pixel data stored in frame buffer 127 that specifies color and intensity values for the different pixel positions within a display image.

Between vertex processing unit 260, geometry processing unit 266 and fragment processing unit 270 are primitive assembly unit 264 and primitive assembly and rasterizer unit 268. The primitive assembly unit 264 is typically a fixed-function unit that receives processed vertex data from vertex processing unit 260 and constructs graphics primitives, e.g., points, lines, triangles, or the like, for processing by geometry processing unit 266. Primitive assembly and rasterizer unit 268, which is optional in various implementations, may receive the graphics primitives output by geometry processing unit 266, such as a set of triangles, perform clipping operations to limit the triangles passed to fragment processing unit 270 to ones that are viewable on display device 130, and generate fragments for each pixel covered by the primitive. During rendering operations, the processing units of graphics rendering pipeline 135 may access data from a parameter buffer object 129 and/or bindable uniform buffer object 131, represented in FIG. 2 by an arrow 235.

The processing performed by vertex processing unit 260, geometry processing unit 266, and fragment processing unit 270 may be defined by shader programs 214, which may include some combination of a vertex shader program 220, a geometry shader program 222, and a fragment shader program 224. In one embodiment, under the first programming model, these shader programs may be written using a high-level shading language, such as the Cg or GLSL shading languages, and transmitted to API 117 for processing within GPU driver 119. Again, the shader programs are then compiled and linked by a compiler/linker 122 included with GPU driver 119 to produce a linked version of the shader programs. In one embodiment, the output of compiler/linker 122 may include linked program object 240. The linked program object 240 may include multiple shader programs as well as a buffer object bindings table 226 used to manage the bindings between a given shader program and the binding points of hardware binding table 126.

The code generated by the compiler/linker 122 may be in the form assembly code, in which case it is then converted into machine code (also referred to as "microcode") by microcode assembler 124. Alternately, the compiler/linker may directly generate machine code, in which case the GPU driver 119 may not include a microcode assembler 124. The machine code versions of the shader programs are then transmitted to the vertex processing unit 260, the geometry processing unit 266 and the fragment processing unit 270, as the case may be, for execution. In alternative embodiments, under the second programming model the vertex shader program 220, the geometry shader program 222 and the fragment shader program 224 may be written in assembly code or may be compiled into assembly code externally to GPU driver 119. In such embodiments, GPU driver 119 would not necessarily include compiler/linker 122, and GPU driver 119 would receive assembly code versions of the shader programs directly. Assembler 124 would then convert the assembly code into machine code and transmit the machine code versions of the shader programs to the appropriate processing units of the graphics rendering pipeline 135, as set forth above.

API 117 may include calls used to write data generated by one of the processing units of the graphics rendering pipeline 135 into buffer objects 129 and/or 131. API 117 may also include calls used to modify the data in buffer objects 129 and/or 131. For example, buffer objects 129 and/or 131 may be loaded or modified using a transform feedback pathway, which captures selected transformed attributes of vertices processed by vertex processing unit 260 or geometry processing unit 266

Figure 4A:
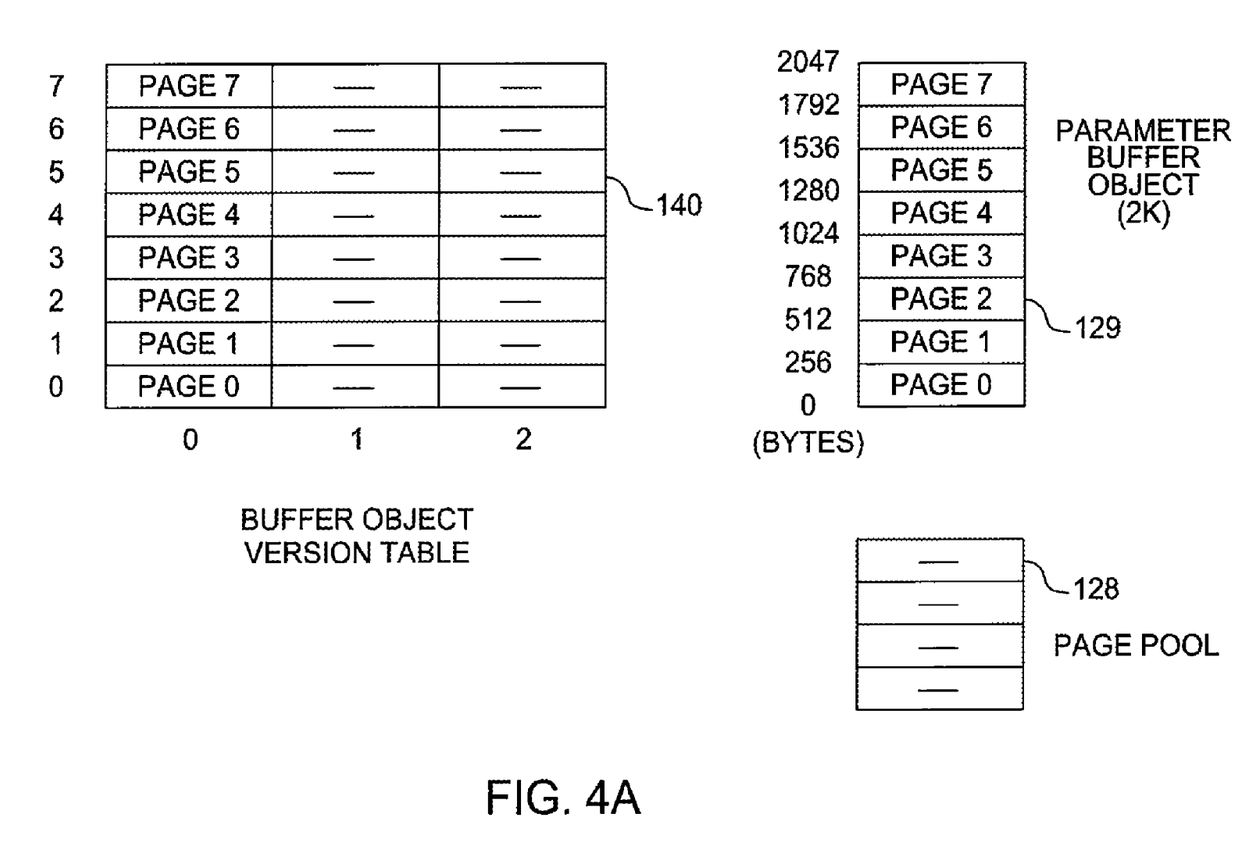
FIGS. 4A-4B illustrate how an in-band update is made to a parameter buffer object, according to one embodiment of the invention.
Figure 4B:
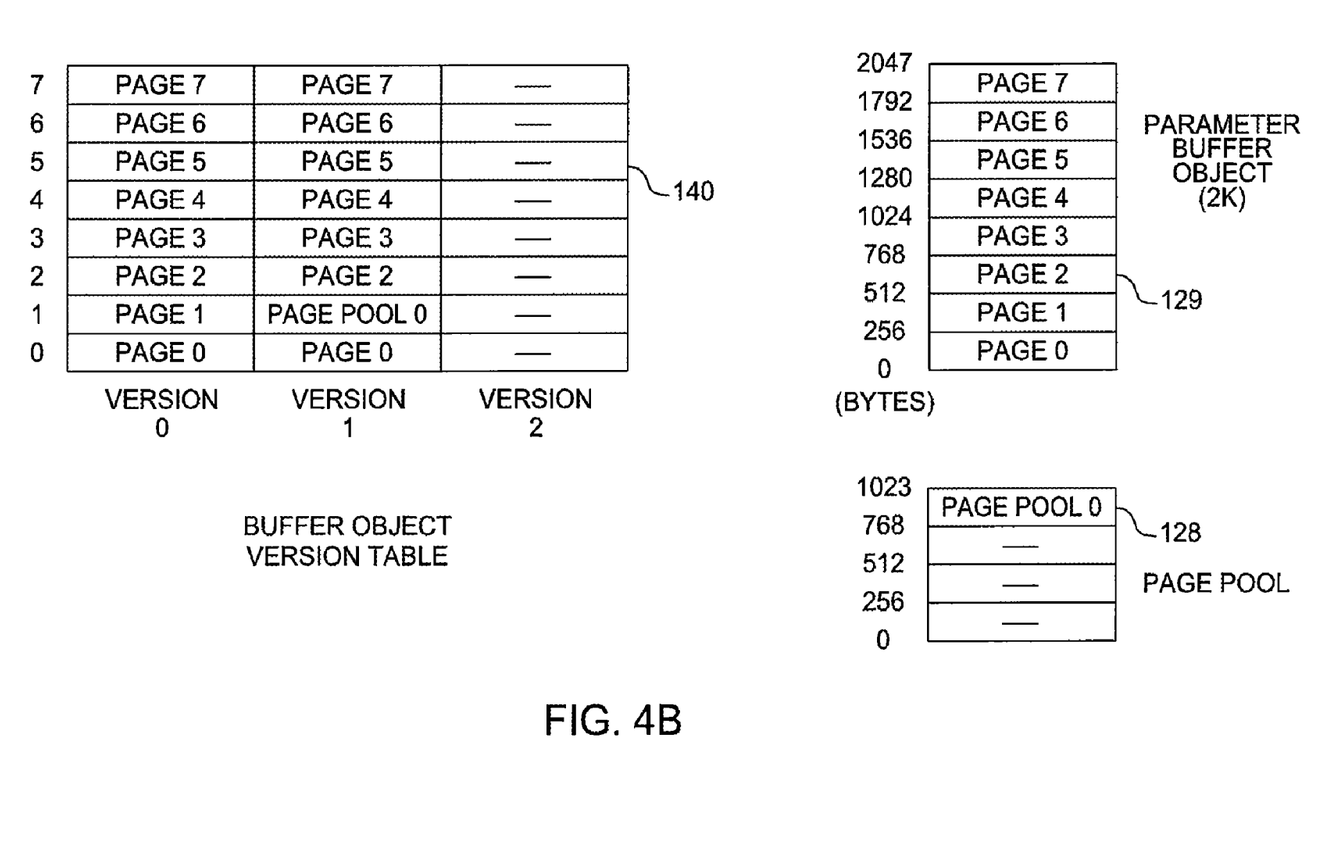
Figure 5:
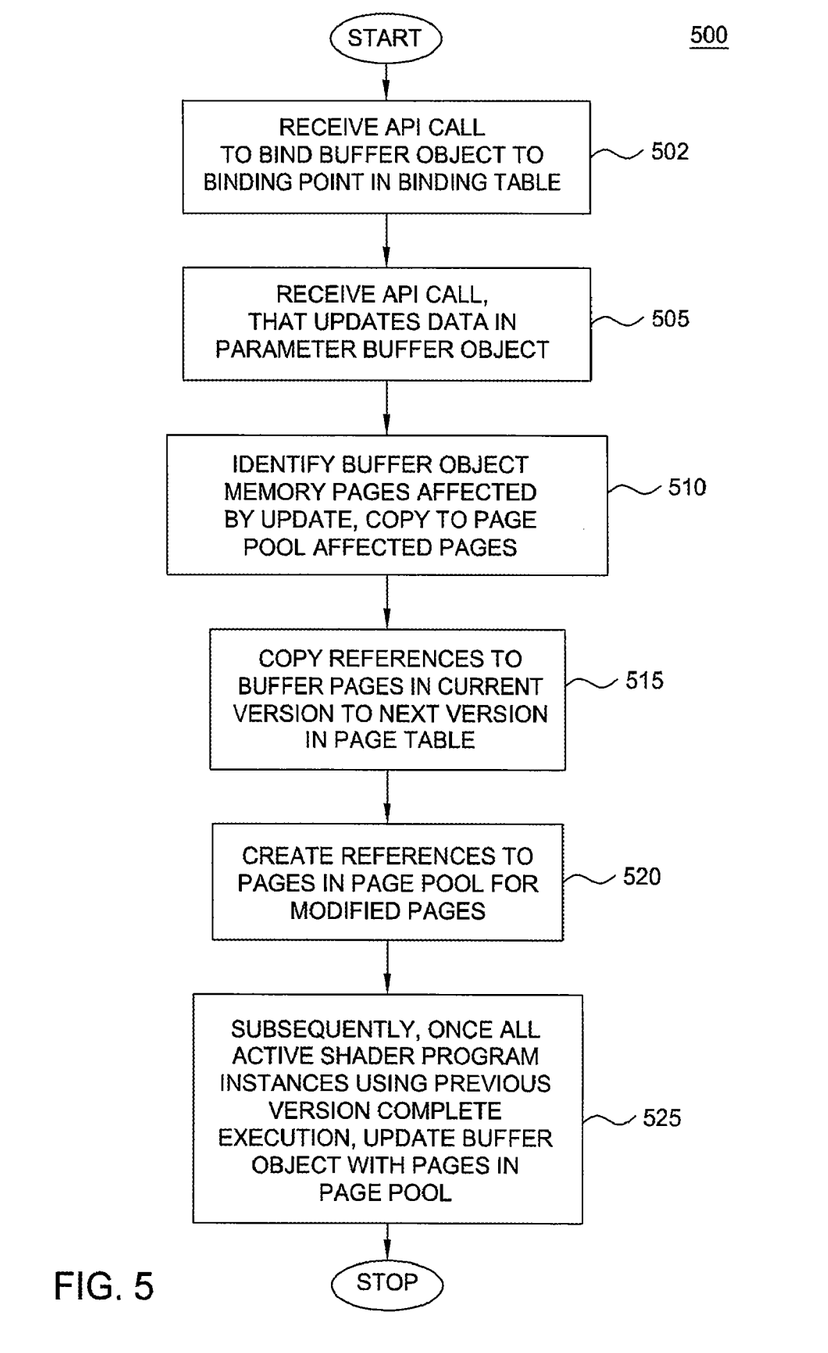
FIG. 5 illustrates a method for updating a parameter buffer object, according to one embodiment of the invention.

Additionally, a linked program object 240 may contain a buffer object bindings table 226. As described in greater detail in conjunction with FIGS. 6-7, buffer object binding table 226 is used to store the active bindings for the bindable uniforms in program object 214. Further, API 117 may provide calls allowing application 116 to write data to buffer objects 129 and/or 131. For example, API 117 may provide an API call that allows a developer to map the buffer object 131 to a pointer used by application 116, allowing application 116 to write to buffer objects 129 and/or 131 directly. In one embodiment, an in-band update mechanism, described below in conjunction with FIGS. 3-5, is used to manage updates to buffer objects 129 and/or 131 made using API calls provided by a graphics library.

Parameter Buffer Objects and In-Band Updates

Figure 3:
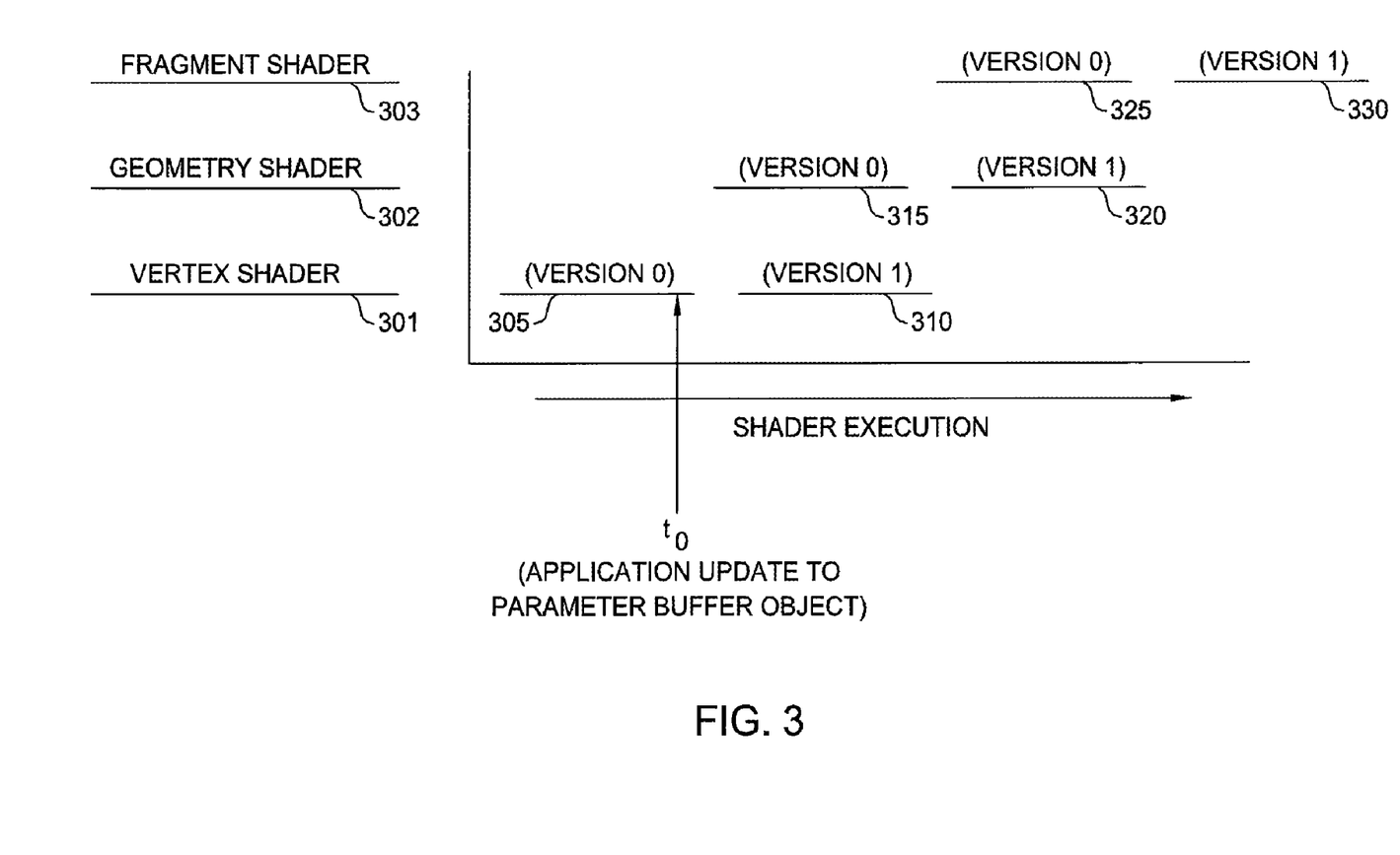
FIG. 3, is a conceptual timing diagram illustrating shader programs running on the processing units within a graphics rendering pipeline when an in-band update is made to a parameter buffer object, according to one embodiment of the invention.

FIG. 3 is a conceptual timing diagram illustrating shader programs 118 running on the processing units within graphics rendering pipeline 135 when an in-band update is made to parameter buffer object 129, according to one embodiment of the invention. One of skill in the art will recognize that the in-band update mechanism used for parameter buffer object 129, described herein, may also be used to update a buffer object bound to a bindable uniform.

As shown, the execution of vertex, geometry, and fragment shader programs flows from left to right, and an in-band update occurs to a parameter buffer object 129 at time $t_0$. A vertex shader program 301 executes a first time using version 0 of parameter buffer object 129 (segment 305). A geometry shader program 302 and a fragment shader program 303 also execute using version 0 of parameter buffer object 129 (segments 315 and 325). After the update to parameter buffer object 129, a second execution of vertex shader program 301 runs at a second time using version 1 of parameter buffer object 129 (segment 310). Similarly, geometry shader program 302 and fragment shader program 303 also execute using version 1 of parameter buffer object 129 (segments 320 and 330). The vertex processing unit 260, geometry processing unit 266, and fragment processing unit 270 are logically arranged in a serial pipeline, and vertex, fragment, and geometry shader programs (e.g., programs 220, 222, and 224) may execute on the respective processing units of graphics rendering pipeline, concurrently. Thus, as can be seen in FIG. 3, vertex shader program 301 executes using version 1 (segment 310), while concurrently, geometry shader program 302 executes using version 0 (segment 315) of parameter buffer object 129. To support this parallel execution, when a shader program is executed on one of the processing units of graphics rendering pipeline 135, the shader program may be configured to use a version of parameter buffer object specified in buffer object version table 140.

FIG. 4A illustrates a state of buffer object version table 140, parameter buffer object 129, and page pool 128 before an in-band update to parameter buffer object 129 occurs at time $t_0$, according to one embodiment of the invention. Illustratively, parameter buffer object 129 is shown to be 2048 bytes in size, divided into memory pages of 256 bytes each. In this example, buffer object version table 140 is configured to store page references for up to three different versions of parameter buffer object 129. Prior to the update at time $t_0$, only the version 0 entry includes valid entries. Similarly, prior to the update at time $t_0$, page pool 128 is empty. Entries 0-7 in buffer object version table 140 provide a mapping to pages in local memory 125 for version 0 of buffer object 129. Thus, each entry in buffer object version table 140 may store a memory address in local memory 125. Initially, the addresses map directly to those of the parameter buffer object 129. Of course, the size of memory pages, the maximum size of parameter buffer object 129, and the number of different versions of a buffer object that may exist concurrently depends on the configuration of a particular graphics hardware device 102.

FIG. 4B illustrates a subsequent state of buffer object version table 140, parameter buffer object 129, and page pool 128 after the in-band update to parameter buffer object 129 at time $t_0$ occurs. Illustratively, after the update buffer object version table 140 stores a set of memory addresses for version 1 of parameter buffer object 129. Only the addresses for memory pages affected by the update to parameter buffer object 129 are changed from one version to the next. Thus, in version 1, the addresses for page 0 and for pages 2-7 of parameter buffer object 129 refer to the same memory addresses as the ones stored in version 0. The update at $t_0$ modifies only data stored in page 1 of parameter buffer object 129, that is, some of bytes 256-512 of page 1 are changed by the update. However, rather than simply write the update to page 1 of parameter buffer object 129, the contents of page 1 may be copied to page pool 128 and then modified. The entry for page 1 in version 1 in buffer object version table 140 is then used to store the modified page stored in page 0 of the page pool 128.

Buffer object version table 140 allows multiple shader programs to reference either versions 0 or version 1 of buffer object 129, as appropriate. For example, referring to the timing diagram of FIG. 3, segment 310 represents an instance of vertex shader program 303 executing using version 1 of buffer object 129. Simultaneously, segment 315 represents an instance of geometry shader 302 executing using version 0 of buffer object 129. Thus, the in-band update mechanism of the present invention increases the parallel execution capabilities of graphics rendering pipeline 135. Otherwise, the shader programs represented by segments 305, 315, 325 would first complete executing before the buffer object 129 was updated and segment 310 began executing. In one embodiment, to allow other uses of the buffer object 129 after the update, the GPU will write the updated version of page 1, stored in page 0 of the page pool 128, back to buffer object 129 after all vertex, geometry, and fragment shader programs using version 0 have completed executing. Additionally, as shown, buffer object version table 140 allows up to three entries of buffer object 129 to be active at any given time. Of course, the number of concurrent versions may be dependent on the size of buffer object version table 140, and may be tailored as needed for a particular graphics hardware device.

FIG. 5 illustrates a method 500 for updating a parameter buffer object, according to one embodiment of the invention. Persons skilled in the art will understand that, even though method 500 is described in conjunction with the systems of FIGS. 1-4, any system configured to perform the method steps, in any order, is within the scope of the present invention. Additionally, the method 500 is described in conjunction with elements of the OpenGL API. Persons skilled in the art will appreciate that the information in this section should be considered in conjunction with the version 2.0 of the OpenGL™ specification. Also, in one embodiment, the actions of method 500 may be performed and coordinated by GPU driver 119 in response to API calls included in application 116.

The method 500 begins at step 502, where application invokes a call provided by API 117 to bind one or more buffer objects 129 to binding points in the binding tables 126. In one embodiment, the API may include calls with the following signatures:

void BindBufferRangeNV(enum target, uint index, uint buffer, intptr offset, sizeiptr size);
    void BindBufferOffsetNV(enum target, uint index, uint buffer, intptr offset);
    void BindBufferBaseNV(enum target, uint index, uint buffer);

In these API calls, the <target> parameter identifies the binding table 132, 134, or 136 used to update, and the <index> parameter identifies the binding point in this table. The <buffer> parameter specifies a name of a buffer object. And the <offset> and <size> parameters, if specified, identify the portion of the memory belonging to a buffer object attached to the binding point. Once a buffer object is bound to a binding point, it may be used both for subsequent in-band update operations and for shader program execution as illustrated in FIG. 1B.

In step 505, application 116 invokes a call provided by API 117 to modify data in a parameter buffer object. In one embodiment, the API may provide calls with the following signatures:

void ProgramBufferParametersfvNV(enum target, uint buffer, uint index, sizei count, const float *params);
    void ProgramBufferParameterslivNV(enum target, uint buffer, uint index, sizei count, const int *params);
    void ProgramBufferParametersIuivNV(enum target, uint buffer, uint index, uint count, const uint *params);

In these API calls, the <target> parameter identifies the binding table 132, 134, or 136 to use for the update and the <buffer> parameter identifies the specific binding point in that table. Elements of the <index> parameter through <index>+<count>−1 of the buffer object bound to that binding point are updated with the data pointed to by the <params> parameter. In one embodiment, the driver 119 transmits the information on the requested update to the GPU 120, so it can perform the in-band update.

At step 510, the memory pages of the buffer object affected by the update may be copied to a memory page pool and modified as specified by the API call received at step 505. Thereafter, at steps 515 and 520, memory addresses for the modified version of the buffer object are stored in the next available version in buffer object version table. At step 515, addresses for the memory pages of the current version of the buffer object are propagated to the next version of the buffer object. At step 520, addresses for the pages modified by the update are set to the addresses of the corresponding pages in the page pool. After steps 515 and 520, the modified version includes a collection of addresses to pages in the original buffer object, and modified pages in the page pool. At the same time, the previous version of the buffer object includes a complete set of references that describe the buffer object before the modification. Thus, any active shader programs may still access the previous version, and any new instances of a shader program may access the modified version.

At step 525, once all the active shader programs using a previous version of the buffer object complete executing, the modified pages in the page pool may be copied to the buffer object, overwriting the corresponding unmodified pages, to produce a modified version of the buffer object. Using the example of FIG. 4B, once all active shader programs using version 0 of parameter buffer object 129 complete executing, the data in page 0 of the page pool 128 may be written to page 1 of buffer object 129, overwriting original page 1 and freeing up space in page pool 128 to store subsequently modified pages. At the same time, the entry for page 1, version 1 in buffer object version table 128 may be updated to store the address of page 1 of buffer object 129.

Bindable Uniforms

Figure 6:
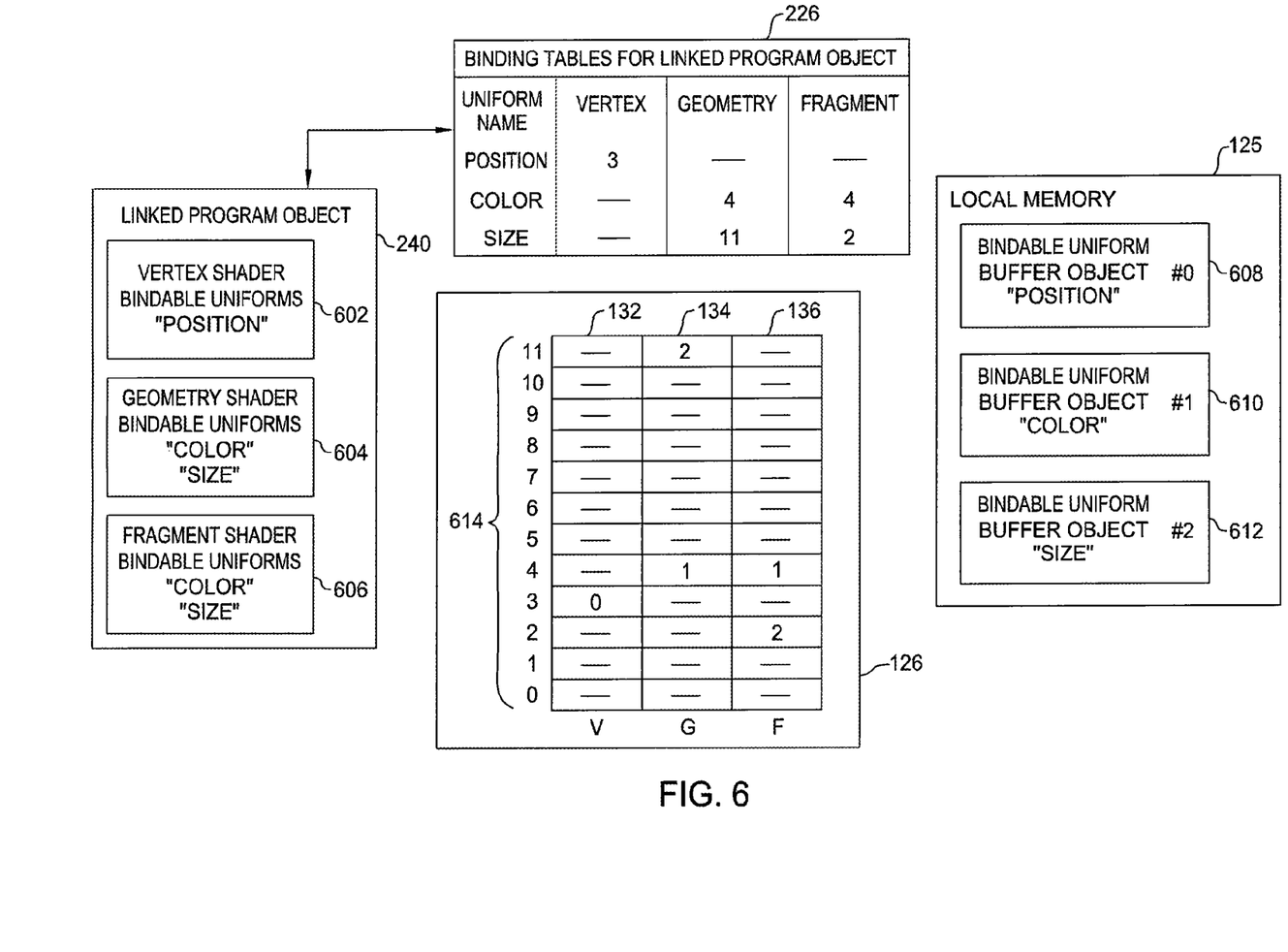
FIG. 6 illustrates a buffer object used as memory storage for a bindable uniform variable, according to one embodiment of the invention.

FIG. 6 illustrates a buffer object used as memory storage for a bindable uniform variable, according to one embodiment of the invention. More specifically, aspects of program object 214, buffer object binding table 226, hardware binding table 126, and bindable uniform buffer object 131 of FIGS. 1 and 2 are further illustrated. As shown, program object 214 includes a vertex shader program 602, geometry shader program 604, and a fragment shader program 606. Each of shader programs includes a declaration of one or more bindable uniform variables. Specifically, vertex shader program 602 references a bindable uniform named "position," geometry shader program 604 references bindable uniforms named "color" and "size," and fragment shader program 606 references the "color," "size," and "position" bindable uniforms.

In one embodiment, when program object 214 is complied and linked by compiler/linker 122, the bindable uniforms declared in shader programs 602, 604 and 606 are set to an unbound state. Thereafter, API calls may be used to bind the "color," "size," and "position" bindable uniforms to the storage space of a buffer object. A buffer object has to first be bound to the bindable uniform before being accessed by a shader program, or before an API call may be used to set the data values of the bindable uniform. Buffer object binding table 226 is used to store the active bindings for the bindable uniforms in program object 214. That is, buffer object binding table 226 stores a reference to a binding point 614 in hardware bindings table 126 which may be used to store the address of a buffer object for a particular bindable uniform. Illustratively, the bindable uniform named "position" included in vertex shader program 602 is bound to binding point 3 in vertex shader binding table 132. Similarly, the bindable uniform named "color" included in geometry shader program 604 and fragment shader 606 is bound to binding point 4 in both geometry shader binding table 134 and fragment shader binding table 136. Lastly, the bindable uniform named "size" included in geometry shader program 604 and fragment shader program 606 is bound to binding point 11 in geometry shader binding table 134 and binding point 2 in fragment shader binding table 136.

Binding points 614 in hardware bindings table 126 map to the bindable uniform buffer objects 608, 610 and 612 in local memory 125. For the vertex shader bindings 132, binding point 3 maps to bindable uniform buffer object 608. That is, to buffer object storage for the "position" bindable uniform. For the geometry shader bindings 134, binding point 4 maps to bindable uniform buffer object 610 and binding point 11 maps to bindable uniform buffer object 612. That is, to buffer object storage for the "color" and "size" bindable uniforms, respectively. And for the fragment shader program 606, binding point 4 maps to bindable uniform buffer object 610 and binding point 2 maps to bindable uniform buffer object 612. That is, to buffer object storage for the "color" and "size" bindable uniforms, respectively.

Figure 7:
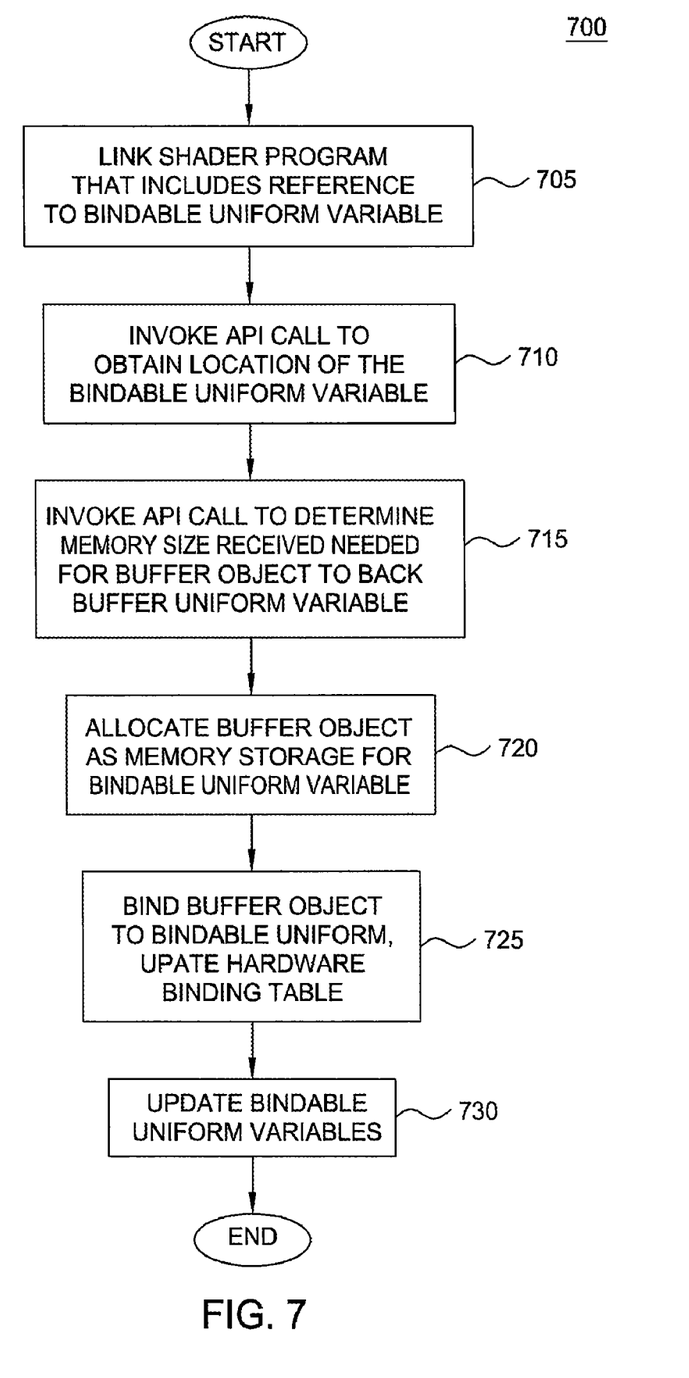
FIG. 7 illustrates is a method 700 for shader program object to declare, load, and bind a bindable uniform variable to a buffer object, according to one embodiment of the invention.

FIG. 7 illustrates is a method 700 for shader program object to declare, load, and bind a buffer object to a bindable uniform variable, according to one embodiment of the invention. Persons skilled in the art will understand that, even though method 700 is described in conjunction with the systems of FIGS. 1, 2, and 5, any system configured to perform the method steps, in any order, is within the scope of the present invention. Additionally, the method 500 is described in conjunction with elements of the OpenGL Shading Language (GLSL) and related OpenGL API calls. Persons skilled in the art will appreciate that the information in this section should be considered in conjunction with the version 2.0 of the OpenGL™ specification. Also, in one embodiment, the actions of method 500 may be performed and coordinated by GPU driver 119 in response to API calls included in application 116.

The method 700 begins at step 705, where a linked program object that includes bindable uniforms is transmitted for execution to one of the processing units of GPU 135. As stated, when a shader program in a program object is complied and linked, any bindable uniforms declared in that shader programs, are set to an unbound state. Thereafter, calls included in API 117 may be used to bind a buffer object to a bindable uniform variable referenced by the linked shader program.

At step 710, an API call may be used to determine the location of a specific bindable uniform variable. For example, the OpenGL API includes a call with the following signature:

int glGetUniformLocation(uint program, const char *name)

Invoking this call with the program ID of a given shader program and the name of a bindable uniform variable returns a reference to the bindable uniform specified by the <name> parameter. In other words, the value returned by glGetUniformLocation may be used to specify the bindable uniform variable side of a binding between a given bindable uniform and buffer object.

At step 715, an API call may be used to determine the size of a buffer object required for the bindable uniform variable specified at step 710. For example, the OpenGL API may be extended to include a call with a signature like the following:

int glGetUniformBufferSize (uint program,uint location)

This API call returns the size, in basic machine units (e.g., bytes), of the smallest buffer object that can be used for the bindable uniform given by the <location> parameter. The size returned may subsequently be passed as the <size> parameter to the BufferData( ) command used to populate a buffer object with application data. The error INVALID_OPERATION is generated if <location> does not correspond to an active bindable uniform in the shader program specified by the <program> parameter. The parameter <location> has to be the location corresponding to the name of the bindable uniform itself returned by the glGetUniformLocation( ) call, otherwise the error INVALID_OPERATION is generated.

At step 720, API calls may be used to allocate storage for a buffer object from local memory and to populate the buffer object with data supplied by application 116. For example, the OpenGL API includes a call with the following signature:

void BufferData(enum target, sizeiptr size, const void * data, enum usage);

This call may be used to initialize the data store for a buffer object with data specified by the <data> parameter. Additionally, as described above, other API calls may be used to write to a buffer object.

At step 725, an API call may be used to bind the buffer object specified in step 720 to the bindable uniform variable identified in step 710. For example, the OpenGL API may be extended to include a call with a signature like the following:

void UniformBufferNV(uint program, int location, uint buffer)

This API call binds the buffer object specified by the <buffer> parameter to the bindable uniform <location> in the program object <program>. The parameter <location> has to correspond to the name of the uniform variable itself, as described for the GetUniformLocation API call, otherwise the error INVALID_OPERATION is generated. If the <program> parameter has not been successfully linked, or if the <buffer> parameter is not the name of an existing buffer object, then the error INVALID_OPERATION may be generated.

In one embodiment, a buffer object may be bound to, at most, one uniform variable in a given program object. However, a buffer object may be bound to bindable uniform variables in multiple program objects. Furthermore, if those bindable uniforms are all of the same type, then accessing a scalar, vector, a member of a structure, or an element of an array in program object A results in the same data being accessed in program object B.

At step 730, an API call may be used to update the values of the bindable uniform. The bindable uniform may be updated using one of the well-known API commands used to update the contents of a buffer object. Additionally, well-known API commands may be used to directly update the values of the bindable uniforms used by the active program object. For example, the OpenGL API call with a signature:

void Uniform4fv(int location, size count, float *values)

may be used to update a bindable uniform declared as an array of four-component vectors. <location> identifies the bindable uniform being updated, <count> identifies the number of array elements to update, and <values> identifies the new values of the uniform. The advantageous in-band update mechanism described above may be used to update the uniform values with increased efficiency.

Advantageously, by allowing uniform variables to be bound to storage provided by a buffer object, the API, in effect, allows a mechanism for sharing data sets among multiple program objects and shader programs. Further, the use of buffer objects as parameter buffer objects or as the storage space for a bindable uniform allows a number of graphics rendering operations to be performed without requiring intervention by a CPU, thereby increasing the performance of the graphics rendering hardware. Additionally, a graphics API may be used to update data values stored in a buffer object during rendering operations without having to wait until all active shader programs using one version of data in the buffer object have completely executed before the data values stored in the buffer object may be updated, further increasing GPU performance.

While the foregoing is directed to embodiments of the present invention, other and further embodiments of the invention may be devised without departing from the basic scope thereof, and the scope thereof is determined by the claims that follow.

One embodiment of the invention provides a computer-readable medium that includes program instructions that when executed by a processor cause the processor to bind a bindable uniform variable to a buffer object, by performing the steps of: creating a linked program object comprising one or more shader programs, where each shader program includes instructions written in a high-level shader language, and where the linked program object includes a reference to a bindable uniform variable and indicates which shader programs use the bindable uniform variable; determining a memory size to support the bindable uniform variable; allocating a buffer object having the memory size; binding the buffer object to the bindable uniform variable; populating the buffer object with values for the bindable uniform variable; and accessing the values of the bindable uniform with one or more of the shader programs in the linked program object.

We claim:

1. A method for accessing a bindable uniform variable bound to a buffer object, the method comprising:

creating a linked program object comprising two or more shader programs, wherein each shader program is executed by a different processing unit and includes instructions written in a high-level shader language, and wherein the linked program object includes a reference to a bindable uniform variable and indicates which shader programs use the bindable uniform variable;

determining a memory size to support the bindable uniform variable;

allocating a buffer object having the memory size;

binding the buffer object to the bindable uniform variable;

populating the buffer object with values for the bindable uniform variable;

accessing the values of the bindable uniform with one or more of the shader programs in the linked program object, wherein the buffer object provides the values of the bindable uniform variable for each of the two or more shader programs;

performing a first execution of a shader program that accesses an original value for a first portion of data in the buffer object, wherein the buffer object includes a plurality of portions of data;

receiving a request to update the first portion of the data in the buffer object;

updating the first portion of data, which includes:

copying pointers from a first version of the buffer object in a buffer object versions table to a second version of the buffer object in the buffer object versions table, wherein each pointer corresponds to a different one of the plurality of portions of data included in the buffer object,     copying the first portion of the data in the buffer object to a page pool,     modifying the first portion of data in the page pool to produce a first modified portion of data, and     changing a pointer to the first portion of data in the second version of the buffer object in the buffer object versions table to point to an address of the first modified portion of data in the page pool data within the buffer object is updated; and performing a second execution of a shader program that accesses an updated value for the first portion of data, wherein the second execution of a shader programs occurs without waiting for the execution of the first shader program to complete.

2. The method of claim 1, further comprising the step of binding the buffer object to each of the one or more shader programs in the linked program object that access the bindable uniform variable.

3. The method of claim 1, wherein each of the one or more shader programs comprises one of a vertex shader program, a geometry shader program or a fragment shader program.

4. The method of claim 1, wherein the buffer object provides the values of the bindable uniform variable for a first linked program object and for a second linked program object.

5. The method of claim 1, wherein the values of the bindable uniform variable are changed by binding a second buffer object to the linked program object to replace the first buffer object.

6. The method of claim 1, wherein the values of the buffer object are loaded via a transform feedback path or by reading pixel data values stored in a frame buffer.

7. A computer-readable storage medium, excluding transitory signal-bearing media, storing program instructions that, when executed by a processor, cause the processor to bind a bindable uniform variable to a buffer object, by performing the steps of:
  creating a linked program object comprising two or more shader programs, wherein each shader program includes instructions written in a high-level shader language, and wherein the linked program object includes a reference to a bindable uniform variable and indicates which shader programs use the bindable uniform variable;
  determining a memory size to support the bindable uniform variable;
  allocating a buffer object having the memory size;
  binding the buffer object to the bindable uniform variable;
  populating the buffer object with values for the bindable uniform variable;
  accessing the values of the bindable uniform with one or more of the shader programs in the linked program object, wherein the buffer object provides the values of the bindable uniform variable for each of the two or more shader programs,
  performing a first execution of a shader program that accesses an original value for a first portion of data in the buffer object, wherein the buffer object includes a plurality of portions of data;
  receiving a request to update the first portion of the data in the buffer object;
  updating the first portion of data, which includes:
    copying pointers from a first version of the buffer object in a buffer object versions table to a second version of the buffer object in the buffer object versions table, wherein each pointer corresponds to a different one of the plurality of portions of data included in the buffer object,
    copying the first portion of the data in the buffer object to a page pool,
    modifying the first portion of data in the page pool to produce a first modified portion of data, and
    changing a pointer to the first portion of data in the second version of the buffer object in the buffer object versions table to point to an address of the first modified portion of data in the page pool data within the buffer object is updated; and
  performing a second execution of a shader program that accesses an updated value for the first portion of data, wherein the second execution of a shader programs occurs without waiting for the execution of the first shader program to complete.

8. The computer-readable storage medium of claim 7, wherein the steps further comprise of binding the buffer object to each of the one or more shader programs in the linked program object that access the bindable uniform variable.

9. The computer-readable storage medium of claim 7, wherein each of the one or more shader programs comprises one of a vertex shader program, a geometry shader program or a fragment shader program.

10. The computer-readable storage medium of claim 7, wherein the buffer object provides the values of the bindable uniform variable for a first linked program object and for a second linked program object.

11. The computer-readable storage medium of claim 7, wherein the values of the bindable uniform variable are changed by binding a second buffer object to the linked program object to replace the first buffer object.

12. The computer-readable storage medium of claim 7, wherein the values of the buffer object are loaded via a transform feedback path or by reading pixel data values stored in a frame buffer.

13. A computing device configured to bind a bindable uniform variable to a buffer object, the computing device comprising:
  a graphics processing unit;
  a local memory coupled to the graphics processing unit and including a buffer object; and
  a software driver for managing the graphics processing unit, wherein the software driver is configured to:
    create a linked program object comprising two or more shader programs, wherein each shader program includes instructions written in a high-level shader language, and wherein the linked program object includes a reference to a bindable uniform variable and indicates which shader programs use the bindable uniform variable;
    determine a memory size to support the bindable uniform variable;
    allocate a buffer object having the memory size;
    bind the buffer object to the bindable uniform variable; and
    populate the buffer object with values for the bindable uniform variable, wherein the buffer object provides the values of the bindable uniform variable for each of the two or more shader programs
    cause a first execution of a shader program that accesses an original value for a first portion of data in the buffer object, wherein the buffer object includes a plurality of portions of data;
    receive a request to update the first portion of the data in the buffer object;
    update the first portion of data, which includes:
      copying pointers from a first version of the buffer object in a buffer object versions table to a second version of the buffer object in the buffer object versions table, wherein each pointer corresponds to a different one of the plurality of portions of data included in the buffer object,
      copying the first portion of the data in the buffer object to a page pool,
      modifying the first portion of data in the page pool to produce a first modified portion of data, and
      changing a pointer to the first portion of data in the second version of the buffer object in the buffer object versions table to point to an address of the first modified portion of data in the page pool data within the buffer object is updated; and cause a second execution of a shader program that accesses an updated value for the first portion of data, wherein the second execution of a shader programs occurs without waiting for the execution of the first shader program to complete.

14. The computing device of claim 13, wherein the buffer object provides the values of the bindable uniform variable for a first linked program object and for a second linked program object.

15. The computing device of claim of claim 13, wherein the values of the bindable uniform variable are changed by binding a second buffer object to the linked program object to replace the first buffer object.

16. The computing device of claim of claim 13, wherein the values of the buffer object are loaded via a transform feedback path or by reading pixel data values stored in a frame buffer managed by the graphics processing unit.

* * * * *